(12) United States Patent
Han

(10) Patent No.: US 6,308,508 B1
(45) Date of Patent: Oct. 30, 2001

(54) STEEL CORD FOR REINFORCEMENT OF A RADIAL TIRE AND A RADIAL TIRE EMPLOYING THE SAME

(75) Inventor: Yong Sik Han, Taejon (KR)

(73) Assignee: Hankook Tire Co., Ltd. (KR)

( * ) Notice: Subject to any disclaimer, the term of this patent is extended or adjusted under 35 U.S.C. 154(b) by 0 days.

(21) Appl. No.: 09/392,181

(22) Filed: Sep. 9, 1999

(30) Foreign Application Priority Data

Sep. 10, 1999 (KR) .................................................. 98-37286

(51) Int. Cl.$^7$ .................................................. D02G 03/48
(52) U.S. Cl. .................................. 57/200; 57/212; 57/213; 57/214; 57/215; 57/216; 428/364; 428/369; 428/371; 428/373; 428/375; 428/545; 428/592
(58) Field of Search .............................. 57/200, 212, 213, 57/214, 215, 216; 152/451; 428/364, 369, 371, 373, 375, 545, 592

(56) References Cited

U.S. PATENT DOCUMENTS

| | | | |
|---|---|---|---|
| 2,055,948 | * 9/1936 | Selquist | 174/129 R |
| 4,022,009 | * 5/1977 | Van Assendelft | 57/212 |
| 5,118,568 | * 6/1992 | Okamoto et al. | 428/364 |
| 5,162,067 | * 11/1992 | Miyawaki | 152/451 |
| 5,223,060 | * 6/1993 | Imamiya et al. | 152/451 |
| 5,319,915 | * 6/1994 | Kobayashi et al. | 57/200 |
| 5,888,321 | * 3/1999 | Kazama et al. | 152/451 |

* cited by examiner

*Primary Examiner*—John J. Calvert
*Assistant Examiner*—Shaun R Hurley
(74) *Attorney, Agent, or Firm*—Welsh & Katz, Ltd.; Thomas W. Tolpin

(57) ABSTRACT

A steel cord for reinforcement of a radial tire and a radial tire employing the same are disclosed. The steel cord is made of more than three steel filaments of which one or two filaments are regularly twisted, the other filaments are open-twisted and each filament is twisted in same direction. Each steel filament using carbon steel has the carbon content of 0.7 to 0.96 wt %, the tensile strength of the filament is in the range of 260 to 380 kgf/mm2, the twisting pitch is 10 to 20 mm, and each filament is plated with brass. The topping characteristic is improved and the uniformity of tire is enhanced.

3 Claims, 2 Drawing Sheets

STEEL CORD FOR REINFORCEMENT OF A RADIAL TIRE AND A RADIAL TIRE EMPLOYING THE SAME

BACKGROUND OF THE INVENTION

1. Field of the Invention

The present invention relates to a steel cord for use in the reinforcement of rubber products such as pneumatic radial tires, particularly to a steel cord made of three steel filaments of which one filament is regularly twisted, two filaments are open-twisted and each filament is twisted in the same direction, which improves the topping processability of rubber and enhances the uniformity of the tires. The present invention also relates to a radial tire employing the same steel cord.

2. Related Art

In general, in steel cords with a so-called 1×3, 1×4 or 1×5 construction, for example, steel cords with a so-called 1×3 construction, each steel filament has the same diameter and is open-twisted. In FIG. 3–FIG. 4, conventional steel cords such as an open-twisted cord 101 and a regular-twisted cord 102 are shown. In FIG. 5, the conventional filaments 100a, 100b, 100c for open-twisting are shown in an untwisted condition.

These steel filaments are open-twisted in order to enhance the rubber penetration into the steel cord in comparison to a regular or close-twisted cord.

Further the open-twisted cord is used after being rolled once more so that the cord has an oval section(Roll Forming), or at least one of the three filaments is rolled on or through a polygonal roll before being twisted(Pre-Forming).

The open-twisted cord or the oval sectioned cord improves the rubber penetration into the cord when rubber topping. However, the low load elongation(LLE) of the open-twisted or oval sectioned cord which has its untwisted filaments having high shape maintenance property is far higher in comparison to a regular or close cord which has its untwisted filaments having low shape maintenance property. For example, in the low load range of 0.3–1.6 kgf, the elongation of the regular twisted cord is usually less than 0.08% and that of the open-twisted or oval sectioned is about 0.3%. As a results, in the open-twisted or the oval sectioned cord, a special treatment in adjusting a cord pay off tension for maintaining the open-cord shape is needed during the rubber topping procedure, and the space due to the open-twisting is reduced by causing a little more tension. Further, in the event of manufacturing a rubber sheet using the open-twisted cord, the diameter of the cord and the thickness of the topping sheet increase or vary and finally the weight of the tire increases.

To solve the above described problem, conventionally, one or two of three filaments was pre-formed by a polygonal roll before being twisted to a steel cord. This made it possible to increase the pay off tension of steel cords during the rubber topping procedure which facilitated the rubber topping procedure. However, in this case, a stress concentration was induced at the angled points by the angled filaments formed during pre-forming and so the durability of the tire was reduced.

SUMMARY OF THE INVENTION

It is therefore the object of the present invention to provide a steel cord for the reinforcement of a radial tire to resolve the above problems having improved topping characteristics and enhancing the uniformity of tire. Furthermore, it is another object of the present invention to provide a radial tire employing the above steel cord.

These objects of the present invention are achieved through use of a steel cord made of three steel filaments of which one filament is regularly twisted, the other filaments are open-twisted, and each filament is twisted in the same direction. As a result, the topping processability of rubber is improved and the uniformity of the tire is enhanced.

BRIEF DESCRIPTION OF THE DRAWINGS

The foregoing objects, features and advantages of the present invention are set out in the following detailed description thereof in conjunction with the accompanying drawings in which.

DETAILED DESCRIPTION OF THE PREFERRED EMBODIMENT

Figure 1:
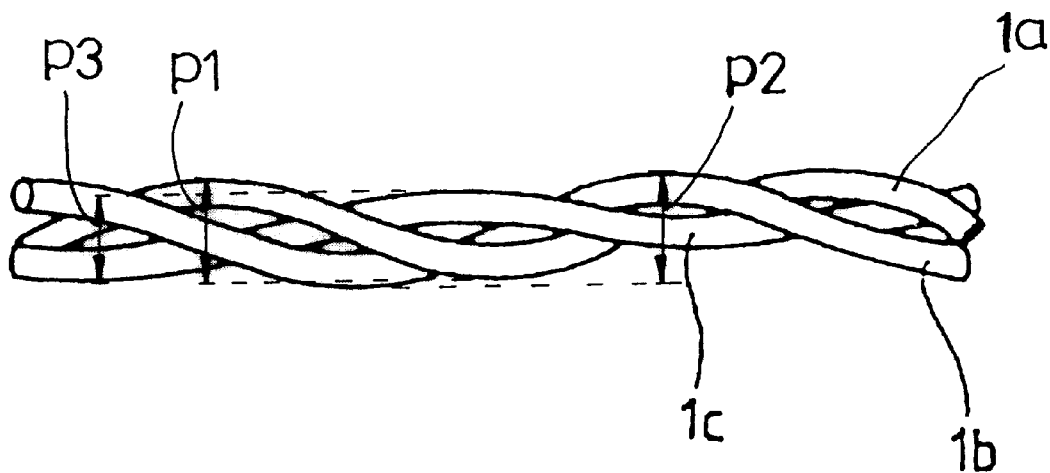
FIG. 1 is a perspective view of a steel cord according to the present invention.

In FIG. 1, a steel cord 1 is illustrated which is twisted in three filaments 1a, 1b, 1c according to the present invention P1, P2 and P3 are the wave heights of the filaments 1a, 1b and 1c respectively in twisted state. The steel cord 1 consists of three steel filaments of which one filament 1c is regularly twisted, the other filaments 1a, 1b are open-twisted, and each filament is twisted in the same direction.

Figure 2:
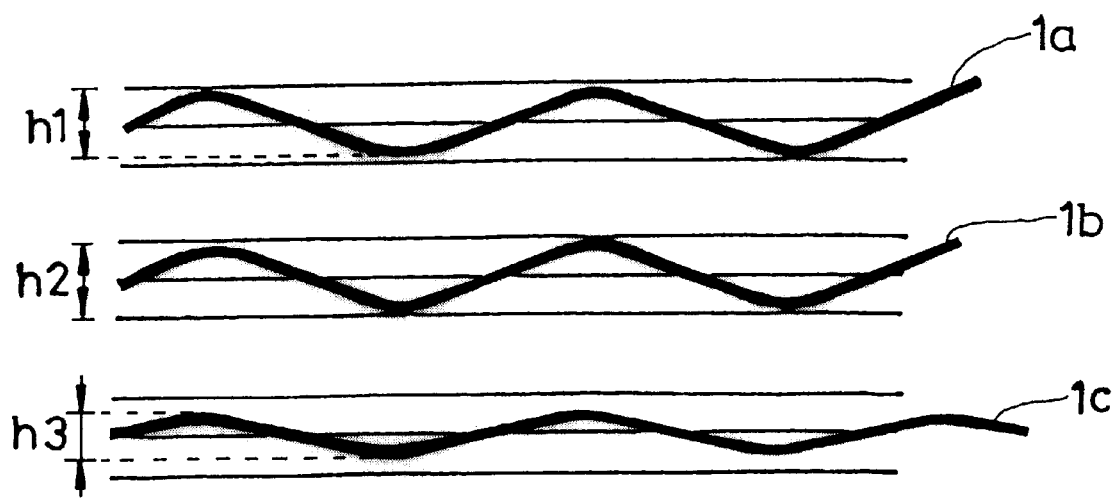
FIG. 2 is an elevation view of each filament untwisted according to the present invention.
Figure 3:
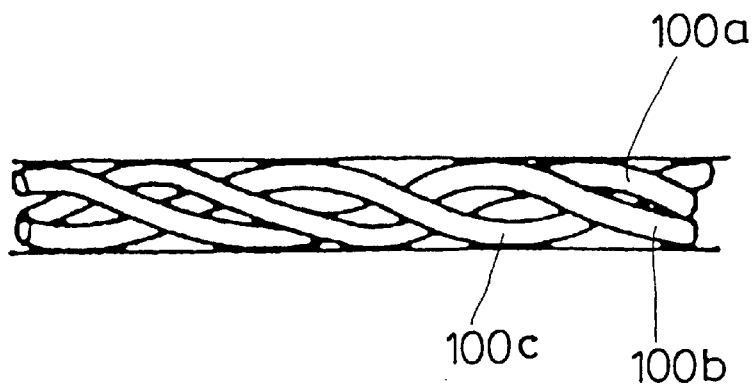
FIG. 3 is a conventional open-twisted cord corresponding to FIG. 1.
Figure 4:
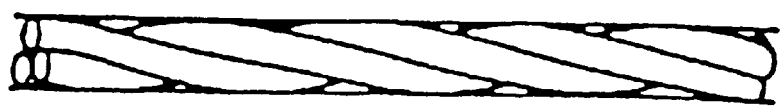
FIG. 4 is a conventional close or regular-twisted cord corresponding to FIG. 1, FIG. 5 comprises conventional filaments corresponding to FIG. 2.
Figure 5:
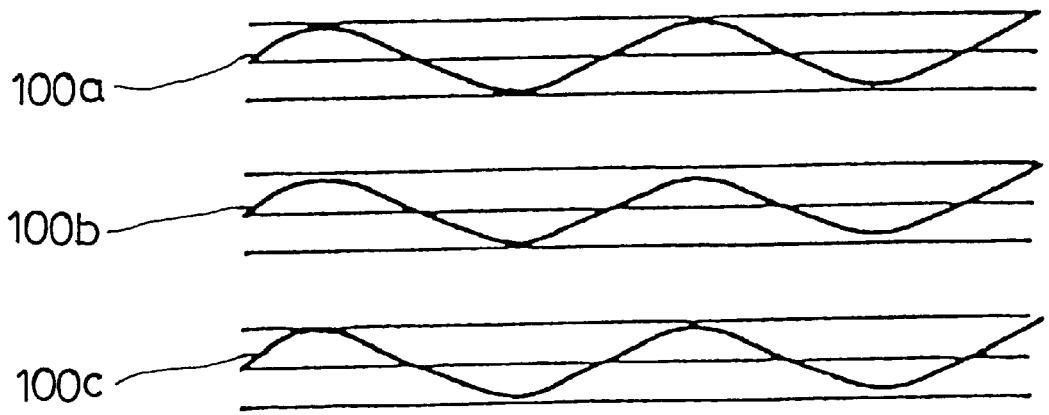

FIG. 2 shows the three filaments 1a, 1b and 1c in untwisted. The wave heights of the filaments 1a, 1b and 1c are directed as H1, H2 and H3 respectively in untwisted state.

Then, the factor K=H/P(%) is defined as a shape maintenance property of a filament. That is, the shape maintenance property of each filament 1a, 1band 1c is K1=H1/P1×100, K2=H2/P2×100 and K3=H3/P3×100 respectively.

Two filaments(1a, 1b) of three filaments have 90–120% of high shape maintenance property respectively, wherein the difference of the shape maintenance property is less than 5%. The other filament(1c) has 70–90% of low shape maintenance property.

The shape maintenance properties of three filaments above-mentioned are summarized as follows.

K1=K2=90–120%,

|K1−K2|<5%,

K3=70–90%,

K3<K1, or K2.

The open-twisted filaments 1a, 1b having high shape maintenance property provide rubber coating with a space to permeate therebetween, while the regularly twisted filament 1c having low shape maintenance property makes it possible to raise the pay off tension of cords during the rubber topping procedure which facilitates the rubber topping procedure. That is, it is possible in this filament twisting system to raise the pay off tension of cords during the rubber topping procedure without reducing the rubber penetration space.

In detail, during the rubber topping procedures, if a pay off tension is imposed on a steel cord, the tension is mainly charged on the regularly twisted filament 1c having low shape maintenance property. This means that the open-twisted filaments 1a, 1b having high shape maintenance property maintain their shape during the pay off tension, then the space for the rubber coating to penetrate is almost not reduced. According to the present invention, the working time is reduced due to raising the pay off tension and the rubber topping on the steel cord is easily-accomplished.

The carbon content of a steel filament using carbon steel is 0.7 to 0.96 wt %, and the tensile strength level of the filament is in the range of 260 to 380 kgf/mm$^2$ before twisting. Each steel filament has all the same twisting pitch of 10 to 20 mm. The diameter of the open-twisted filament is d1 and that of the regularly twisted filament is d2, wherein d2 is 0.75d1–1.25d1. For example, d1 is 0.25 to 0.35 mm then d2 is 0.19 to 0.44 mm.

The steel filaments are preferably plated with brass. This increases the adhesion force between the steel cords and the rubber.

Also the steel cord of present invention has small elongation in the low load range than the conventional open steel cord because the constitutional elongation which contributes largely to low load elongation of present invention steel cord is much lower than that of open steel cord due to regularly twisted filament 1c having low shape maintenance property and it makes possible to produce rubber topping sheet which has better flatness and dimensional stability. As a result of that the uniformity of tire improved..

According to the present invention, the penetration of rubber topping into the steel cord is improved due to the open-twisted filaments. Further, it is possible to raise the pay off tension of the steel cords during the rubber topping procedure. Then the rubber topping speed may be elevated, and the uniformity of the tire is greatly improved.

In accordance with the provisions of the patent statutes, the principal and mode of operation of the steel cord for reinforcement of a radial tire have been explained and what is considered to represent its best embodiment has been illustrated and described. It should, however, be understood that the invention may be practiced otherwise than as specifically illustrated and described without departing from its spirit or scope.

What is claimed is:

1. A steel cord for reinforcement of a radial tire wherein said steel cord is made of three steel filaments of which two filaments having 90–120% of shape maintenance property respectively within 5% difference are open-twisted, one filament having 70–90% of shape maintenance property is regularly twisted and each filament is twisted in the same direction.

2. The steel cord for reinforcement of a radial tire according to claim 1, wherein each said steel filament using carbon steel has a carbon content of 0.7 to 0.96 wt %, the tensile strength of said filament before twisting is in the range of 260 to 380 kgf/mm2, the twisting pitch is 10 to 20 mm, and each filament is plated with brass.

3. The steel cord for reinforcement of a radial tire according to claim 1, wherein the diameter of the open-twisted filament is d1 and that of the regularly twisted filament is d2, wherein d1 is 0.25 to 0.35 mm and d2 is 0.75d1–1.25d1.

* * * * *

UNITED STATES PATENT AND TRADEMARK OFFICE
CERTIFICATE OF CORRECTION

PATENT NO.    : 6,308,508 B1
DATED         : October 30, 2001
INVENTOR(S)   : Yong Sig Han It is certified that error appears in the above-identified patent and that said Letters Patent is hereby corrected as shown below:

<u>Title page,</u>
Item [75], Inventors, "Yong Sik Han" should be -- Yong Sig Han --.

Signed and Sealed this

Twenty-fourth Day of September, 2002

*Attest:*

*Attesting Officer*

JAMES E. ROGAN
*Director of the United States Patent and Trademark Office*